(12) United States Patent
O'Malley et al.

(10) Patent No.: US 9,948,965 B2
(45) Date of Patent: *Apr. 17, 2018

(54) MANIFEST RE-ASSEMBLER FOR A STREAMING VIDEO CHANNEL

(71) Applicant: Accenture Global Services Limited, Dublin (IE)

(72) Inventors: Meghan O'Malley, New York, NY (US); Jeffrey D. Burgoon, Westfield, NJ (US); Ron Lev, Alpharetta, GA (US); Ryan K. McDonald, Atlanta, GA (US); Joshua Intriligator, New York, NY (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,750

(22) Filed: Aug. 17, 2016

(65) Prior Publication Data

US 2016/0360254 A1 Dec. 8, 2016

Related U.S. Application Data

(63) Continuation of application No. 14/217,760, filed on Mar. 18, 2014, now Pat. No. 9,432,431.

(51) Int. Cl.
*H04L 29/06* (2006.01)
*H04N 21/262* (2011.01)
(Continued)

(52) U.S. Cl.
CPC ..... *H04N 21/26258* (2013.01); *H04L 65/602* (2013.01); *H04L 67/02* (2013.01);
(Continued)

(58) Field of Classification Search
CPC ... H04L 65/602; H04L 65/4084; H04L 67/02; H04L 67/42; H04N 21/26258;
(Continued)

(56) References Cited

U.S. PATENT DOCUMENTS 8,473,628 B2  6/2013 Kapoor et al.
8,495,246 B2  7/2013 Heller et al.
(Continued)

FOREIGN PATENT DOCUMENTS

EP   1 801 715      6/2007
WO   WO 2004/071094   8/2004
(Continued)

OTHER PUBLICATIONS

Sodagar, "The MPEG-DASH Standard for Multimedia Streaming Over the Internet", IEEE Multimedia, IEEE Service Center, vol. 18, No. 4, Apr. 2011, pp. 62-67, XP011378371.
(Continued)

*Primary Examiner* — Alina A Boutah
(74) *Attorney, Agent, or Firm* — Harrity & Harrity, LLP

(57) ABSTRACT

A device is configured to receive a playlist identifying content assets to be played on a streaming video channel. Each of the content assets may include segments. The device may add segment addresses associated with a content asset into a queue. The segment addresses may identify memory locations at which the segments included in the content asset are stored. However, the segments themselves may not be stored by the device or added to the queue. The device may generate a batch of segment addresses from the segment addresses in the queue. The device may publish a channel manifest for the streaming video channel including the batch of segment addresses. The content assets may be accessible via the streaming video channel through a single network
(Continued)

address. The device may periodically update the channel manifest based on the segment addresses in the queue.

20 Claims, 11 Drawing Sheets

(51) Int. Cl.
  *H04L 29/08* (2006.01)
  *H04N 21/2668* (2011.01)
  *H04N 21/845* (2011.01)
  *H04N 21/472* (2011.01)

(52) U.S. Cl.
  CPC ......... *H04L 67/42* (2013.01); *H04N 21/2668* (2013.01); *H04N 21/472* (2013.01); *H04N 21/8456* (2013.01)

(58) Field of Classification Search
  CPC ........... H04N 21/472; H04N 21/23424; H04N 21/8456; H04N 21/4586; H04N 21/2668
  USPC ................. 709/219, 231, 203, 217
  See application file for complete search history.

(56) References Cited

U.S. PATENT DOCUMENTS

| | | | |
|---|---|---|---|
| 8,527,506 B2 | 9/2013 | Franks et al. | |
| 8,762,564 B1* | 6/2014 | Philpott | H04L 65/4084 709/217 |
| 8,799,943 B1* | 8/2014 | Sherwin | H04N 21/812 33/34 |
| 9,432,431 B2 | 8/2016 | O'Malley et al. | |
| 2007/0266065 A1* | 11/2007 | Rosenberg | G06F 17/30053 |
| 2007/0276866 A1* | 11/2007 | Bodin | G06F 17/30035 |
| 2008/0140720 A1 | 6/2008 | Six et al. | |
| 2009/0209237 A1* | 8/2009 | Six | G11B 27/034 455/414.1 |
| 2010/0306656 A1* | 12/2010 | Moloney | G06F 17/30781 715/723 |
| 2011/0004669 A1* | 1/2011 | Navar | G06F 21/10 709/217 |
| 2011/0231660 A1 | 9/2011 | Kanungo | |
| 2011/0246616 A1* | 10/2011 | Ronca | H04N 21/26258 709/219 |
| 2011/0313824 A1* | 12/2011 | Lara | G06Q 30/00 705/14.1 |
| 2012/0047542 A1 | 2/2012 | Lewis et al. | |
| 2012/0016883 A1 | 5/2012 | Asam | |
| 2012/0116883 A1* | 5/2012 | Asam | G06Q 30/0251 705/14.58 |
| 2012/0210375 A1* | 8/2012 | Wong | H04N 21/222 725/93 |
| 2012/0246462 A1* | 9/2012 | Moroney | H04L 63/10 713/151 |
| 2012/0263434 A1 | 10/2012 | Wainner et al. | |
| 2012/0303759 A1* | 11/2012 | Adimatyam | H04L 67/306 709/219 |
| 2013/0003993 A1* | 1/2013 | Michalski | H04H 20/74 381/119 |
| 2013/0080267 A1* | 3/2013 | McGowan | H04N 21/2402 705/14.73 |
| 2013/0091521 A1 | 4/2013 | Phillips et al. | |
| 2013/0159421 A1* | 6/2013 | Yue | H04L 65/4084 709/204 |
| 2013/0198335 A1* | 8/2013 | Goel | H04N 21/234336 709/219 |
| 2013/0283033 A1* | 10/2013 | Ahuja | H04L 9/3213 713/150 |
| 2013/0287212 A1* | 10/2013 | Marko | H04H 20/88 381/2 |
| 2013/0290402 A1* | 10/2013 | Gavade | H04N 21/26258 709/203 |
| 2014/0010517 A1 | 1/2014 | Sheffler et al. | |
| 2014/0025836 A1* | 1/2014 | Gupta | H04N 21/8456 709/231 |
| 2014/0075582 A1* | 3/2014 | Hierro | H04L 63/123 726/30 |
| 2014/0082206 A1* | 3/2014 | Samuell | H04L 65/1069 709/227 |
| 2014/0129618 A1* | 5/2014 | Panje | H04N 21/26258 709/203 |
| 2014/0165118 A1* | 6/2014 | Garcia Mendoza | H04L 65/605 725/90 |
| 2014/0215536 A1* | 7/2014 | Maxwell | H04N 21/47202 725/87 |
| 2014/0280781 A1* | 9/2014 | Gregotski | H04L 65/60 709/219 |
| 2014/0280784 A1* | 9/2014 | Moroney | H04L 65/60 709/219 |
| 2014/0321831 A1* | 10/2014 | Olsen | G11B 27/034 386/241 |
| 2014/0344575 A1* | 11/2014 | Saremi | H04L 63/0428 713/168 |
| 2014/0365491 A1* | 12/2014 | Macaulay | H04L 65/605 707/737 |
| 2015/0040169 A1* | 2/2015 | Hoffert | H04L 65/60 725/88 |
| 2015/0172348 A1* | 6/2015 | Lohmar | H04L 65/607 709/219 |
| 2015/0249845 A1* | 9/2015 | Tirosh | H04H 60/05 725/62 |

FOREIGN PATENT DOCUMENTS

| | | |
|---|---|---|
| WO | WO 2008/058257 | 5/2008 |
| WO | WO 2009/135187 | 11/2009 |
| WO | WO 2010/027961 | 3/2010 |
| WO | WO 2011/139305 | 11/2011 |
| WO | WO 2012/097006 | 7/2012 |
| WO | WO 2014/015110 | 1/2014 |

OTHER PUBLICATIONS

Fecheyr-Lippens, "A Review of HTTP Live Streaming", Jan. 2010, 37 pages, XP002638990.
Pantos et al., "HTTP Live Streaming—draft-pantos-http-live-streaming-10", Apple, Inc., Oct. 15, 2012, 37 pages, XP055143369.
Notification of Transmittal of the International Search Report and the Written Opinion of the International Searching Authority, or the Declaration, corresponding to PCT/US2015/020938, dated Jul. 9, 2015, 14 pages.
Apple Inc., "HTTP Live Streaming Overview", https://developer.apple.com/library/ios/documentation/networkinginternet/conceptual/streamingmediaguide/Introduction/Introduction.html, Feb. 11, 2014, 38 pages.
Brightcove Inc., "Creating and Managing Playlists", http://support.brightcove.com/en/video-cloud/docs/creating-and-managing-playlists, Dec. 9, 2008, 8 pages.
Limelight Networks, "Playlist Developer Guide", http://support.video.limelight.com/support/docs/playlist_guide/, May 4, 2011, 6 pages.
Apple Inc., "Playing and managing content in iTunes", http://support.apple.com/kb/ht1399, Sep. 7, 2007, 5 pages.
UnicornMedia, "Mobile Delivery, Ad Integration and Analytics Made Easy", http://www.unicommedia.com/saleskit/pdf/unicomONCE.pdf, Feb. 17, 2013, 1 page.

\* cited by examiner

| Order Field 510 | Content Asset ID Field 520 | Start Time Field 530 | End Time Field 540 | Manifest Address Field 550 | Publishing Address Field 560 |
|---|---|---|---|---|---|
| 1 | XYZ | 11:00:00 AM | 11:30:00 AM | http://index1.url | http://location.url |
| 2 | RST | 11:30:00 AM | 12:00:00 AM | http://index2.url | http://location.url |
| 3 | MNO | 12:00:00 AM | 2:00:00 PM | http://index3.url | http://location.url |
| 4 | ABC | 2:00:00 PM | 3:00:00 PM | http://index4.url | http://location.url |

Playlist for Channel A

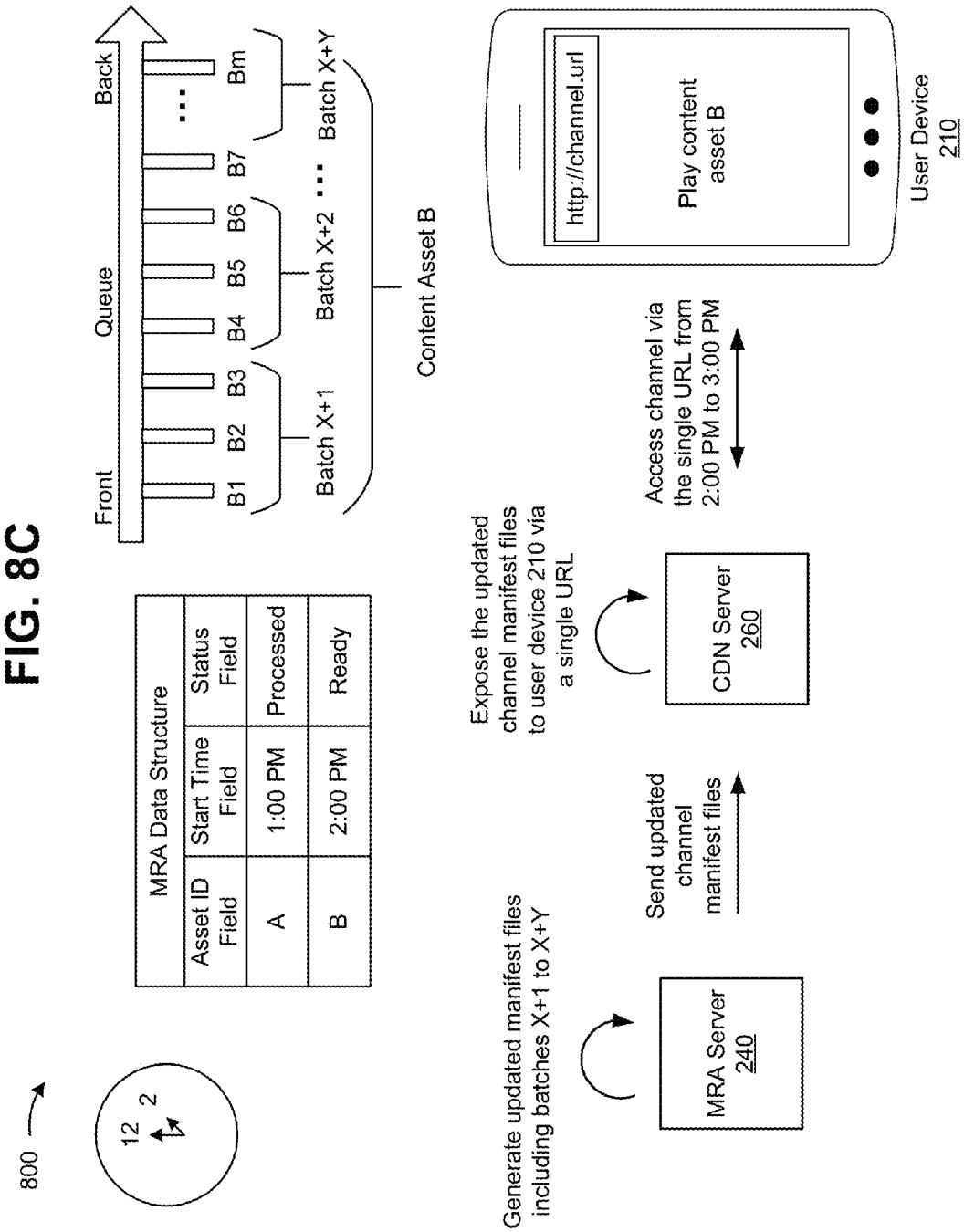

MANIFEST RE-ASSEMBLER FOR A STREAMING VIDEO CHANNEL

RELATED APPLICATION

This application is a continuation of U.S. patent application Ser. No. 14/217,760, filed Mar. 18, 2014 (now U.S. Pat. No. 9,432,431), which is incorporated herein by reference.

BACKGROUND

Videos are widely available on the Internet and may be played using Hypertext Transfer Protocol (HTTP) Live Streaming (HLS). A user may view a video available on the Internet by inputting a uniform resource locator (URL) into an Internet browser associated with the video and using a HLS player to play the video. If the user desires to access another video, the user may input a different URL into the Internet browser associated with the other video.

SUMMARY

In some implementations, a device may receive a playlist identifying content assets to be played on a streaming video channel. Each of the content assets may include segments. The device may determine a content asset is ready for processing. The device may add segment addresses associated with the content asset into a queue. The segment addresses may identify memory locations at which the segments included in the content asset are stored. However, the segments themselves may not be stored by the device or added to the queue. The device may generate a batch of segment addresses from the segment addresses in the queue. The device may publish a channel manifest for the streaming video channel including the batch of segment addresses. The content assets may be accessible via the streaming video channel through a single network address. The device may periodically update the channel manifest based on the segment addresses in the queue.

In some implementations, a computer-readable medium may store instructions that, when executed by a processor of a device, cause the processor to receive a playlist identifying a plurality of content assets to be played on a streaming video channel. Each of the plurality of content assets may include a plurality of segments. The instructions may cause the processor to determine that a content asset is ready to be played on the streaming video channel. The instructions may cause the processor to add a plurality of segment addresses associated with content asset into a queue when the content asset is determined to be ready. The plurality of segment addresses may identify memory locations at which the plurality of segments, included in the content asset, are stored. The plurality of instructions may cause the processor to generate a batch of segment addresses from the plurality of segment addresses in the queue. The plurality of instructions may cause the processor to send a channel manifest for the streaming video channel to a server. The channel manifest may include the batch of segment addresses and the plurality of content assets may be accessible via the streaming video channel through a single network address. The instructions may cause the processor to continually update the channel manifest based on the plurality of segment addresses in the queue.

In some implementations, a method may include receiving, by a device, a playlist identifying a plurality of content assets to be played on a streaming video channel. Each of the plurality of content assets including a plurality of segments. The method may include determining, by the device, a content asset is ready to be played on the streaming video channel based on a start time associated with the content asset, the content asset being included in the plurality of content assets. The method may include adding, by the device, a plurality of segment addresses, associated with the content asset, into a queue. The plurality of segment addresses may identify memory locations at which a plurality of segment files included in the content asset are stored. The method may include generating, by the device, a batch of segment addresses from the plurality of segment addresses in the queue. The method may include publishing, by the device, a channel manifest for the streaming video channel, including the batch of segment addresses, by sending the channel manifest file to a server. The plurality of content assets may be accessible via the streaming video channel through a network address.

BRIEF DESCRIPTION OF THE DRAWINGS

FIGS. 8A to 8C are diagrams of an example implementation relating to the process shown in FIGS. 6A and 6B.

DETAILED DESCRIPTION

The following detailed description of example implementations refers to the accompanying drawings. The same reference numbers in different drawings may identify the same or similar elements.

Rather than providing different videos associated with different URLs, a content holder or operator may desire to provide a channel that a user may access via a single URL. The channel may play multiple videos in a sequential manner much like a TV channel and be played on a user device using HLS. Implementations described herein may provide a channel accessible via a single URL, and may allow an operator of a channel to create a playlist identifying previously recorded programs (e.g., Video-on-Demand (VOD) programs, advertisements, etc.) and/or live programs to be played on the channel.

Figure 1:
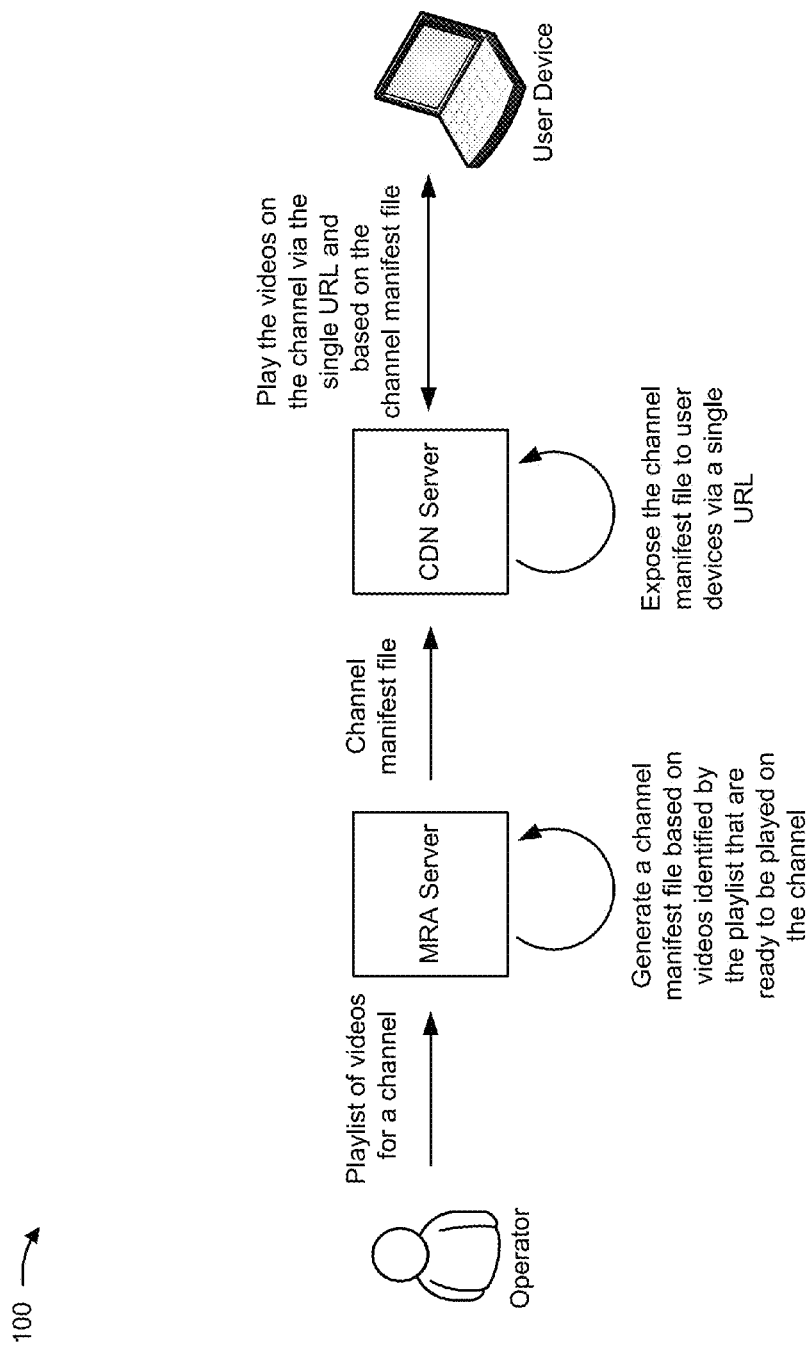
FIG. 1 is a diagram of an overview of an example implementation described herein.

FIG. 1 is a diagram of an overview of an example implementation 100 described herein. Assume an operator creates a playlist identifying multiple videos to be played on a channel accessible via a single URL. Assume each video is divided into multiple segments according to the HLS protocol and is associated with a content asset manifest file. Additionally, assume the playlist includes manifest addresses identifying the location of content asset manifest files associated with each of the videos, and that the playlist identifies start times for each of the videos. Although the playlist may include information identifying multiple videos, the playlist may not include and/or store video files themselves for the videos (e.g., media files). The operator may send the playlist to a manifest re-assembler (MRA) server via a user device operated by the operator.

The MRA server may receive the playlist and store the playlist. The MRA server may determine if a video identified by the playlist is ready for processing based on the start time for the video and a present time (e.g., a time the determination is made). If a video is ready for processing (e.g., the start time matches the present time), the MRA server may access a content asset manifest file associated with the video using the manifest address included in the playlist. The content asset manifest file may include segment addresses identifying the location of segment files associated with the segments of the video. The segment files may be the segments of the video itself. In other words, the segment files may be media files that an HLS player may actually play. The MRA server may obtain the segment addresses for the segments of the video and add the segment addresses to a queue. This process of adding segment addresses to the queue may be repeated for other videos identified in the playlist when the other videos are ready for processing (e.g., the start time for the videos matches the present time).

The MRA server may stitch together multiple segment addresses from the queue to generate a batch of segment addresses for the video(s). The MRA server may generate a channel manifest file based on the batch of segment addresses and send the channel manifest file to a content delivery network (CDN) server. The MRA server may wait a certain amount of time after generating a batch of segment addresses to generate another batch of segment addresses, which will be used to update the channel manifest file.

The CDN server may receive the channel manifest file and expose the channel manifest file to user devices via a single URL. A user of a user device may access the channel manifest file via the single URL and download the channel manifest file. The user device may have a HLS player that accesses the segment files identified by the segment addresses in the channel manifest file and plays the segment files in a continuous manner. Accordingly, a user of the user device may view multiple videos, one after the other, on the channel assessed by the single URL.

In this way, an operator may provide multiple videos to a user via a channel accessed by a single URL.

Figure 2:
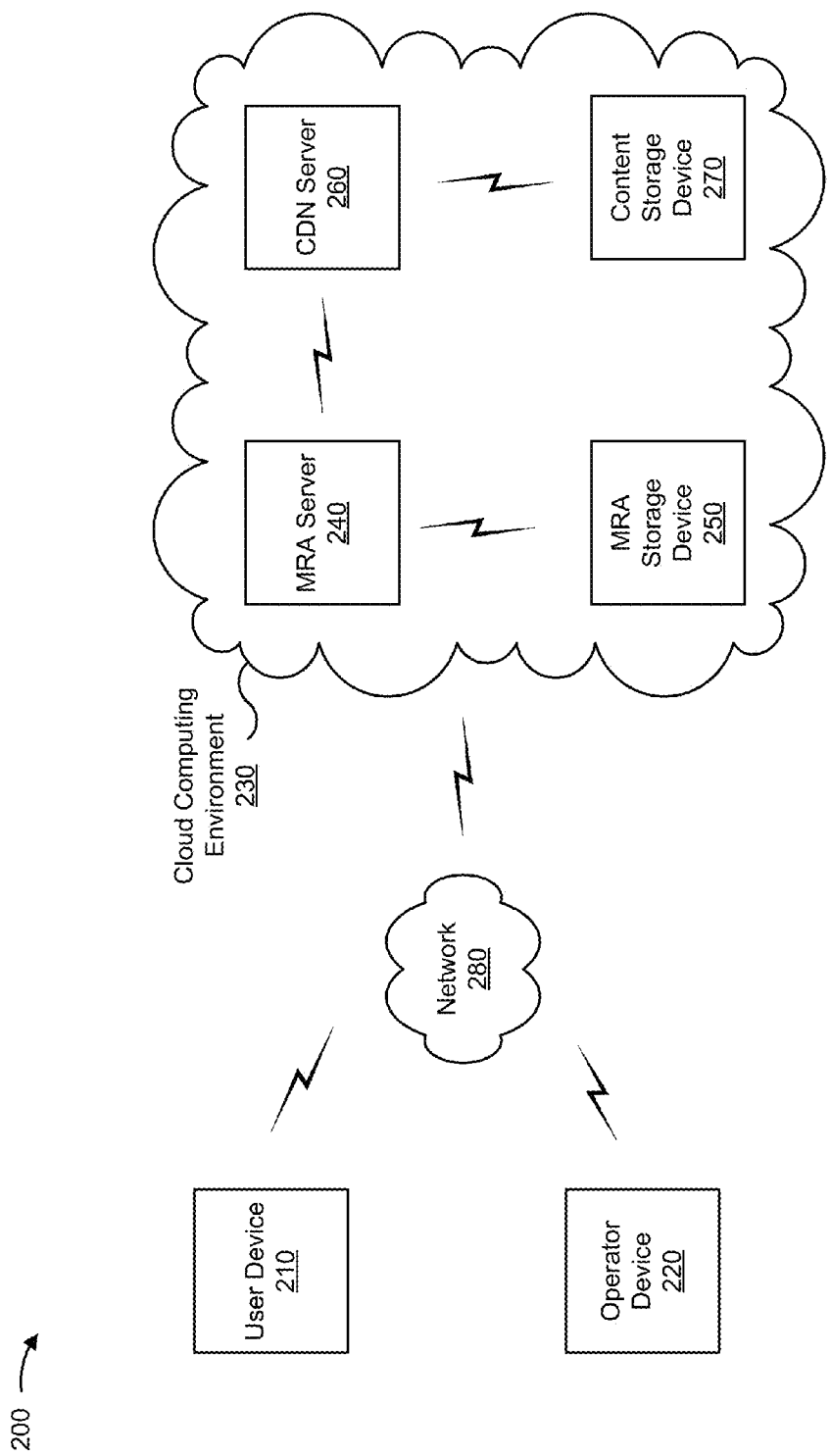
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, an operator device 220, a cloud computing environment 230, and/or a network 280.

User device 210 may include a device capable of communicating with cloud computing environment 230 (e.g., via network 280). For example, user device 210 may include a mobile phone (e.g., a smart phone, a radiotelephone, etc.), a computing device (e.g., a desktop computer, a laptop computer, a tablet computer, a handheld computer, a gaming device, a set-top box, etc.), or a similar device. In some implementations, user device 210 may include a communication interface that allows user device 210 to receive information from and/or transmit information to devices in environment 200. User device 210 may be used by a person viewing content played on a channel.

Operator device 220 may include a device capable of communicating with cloud computing environment 230 (e.g., via network 280). For example, operator device 220 may include a mobile phone (e.g., a smart phone, a radiotelephone, etc.), a computing device (e.g., a desktop computer, a laptop computer, a tablet computer, a handheld computer, a gaming device, a set-top box, etc.), or a similar device. In some implementations, operator device 220 may include a communication interface that allows operator device 220 to receive information from and/or transmit information to devices in environment 200. Operator device 220 may be used by an operator to create a playlist for a channel.

Cloud computing environment 230 may include an environment that delivers computing as a service, whereby shared resources, services, etc. may be provided to user device 210 and/or operator device 220. Cloud computing environment 230 may provide computation, software, data access, storage, etc. services that do not require end-user (e.g., user device 210) knowledge of a physical location and configuration of a system and/or a device that delivers the services. As shown, cloud computing environment 230 may include a MRA server 240, a MRA storage device 250, a content delivery network (CDN) server 260, and/or a content storage device 270.

MRA server 240 may include one or more devices capable of storing, processing, and/or routing information. In some implementations, MRA server 240 may include a communication interface that allows MRA server 240 to receive information from and/or transmit information to other devices in environment 200. In some implementations, MRA server 240 may generate a playlist and/or a channel manifest file for a channel.

MRA storage device 250 may include one or more devices capable of storing, processing, and/or routing information. In some implementations, MRA storage device 250 may include a communication interface that allows MRA storage device 250 to receive information from and/or transmit information to other devices in environment 200. In some implementations, MRA storage device 250 may store playlists for channels and/or information used to create playlists.

CDN server 260 may include one or more devices capable of storing, processing, and/or routing information. In some implementations, CDN server 260 may include a communication interface that allows CDN server 260 to receive information from and/or transmit information to other devices in environment 200. In some implementations, CDN server 260 may publish channel information (e.g., channel manifest files) that user devices 210 may access via a single URL.

Content storage device 270 may include one or more devices capable of storing, processing, and/or routing information. In some implementations, content storage device 270 may include a communication interface that allows content storage device 270 to receive information from and/or transmit information to other devices in environment 200. In some implementations, content storage device 270 may store content assets to be played on the channel.

Network 280 may include one or more wired and/or wireless networks. For example, network 280 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 280 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a cloud computing network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. For example, MRA server 240 and MRA storage device 250 may be in a different cloud computing environment than CDN server 260 and/or content storage device 270. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
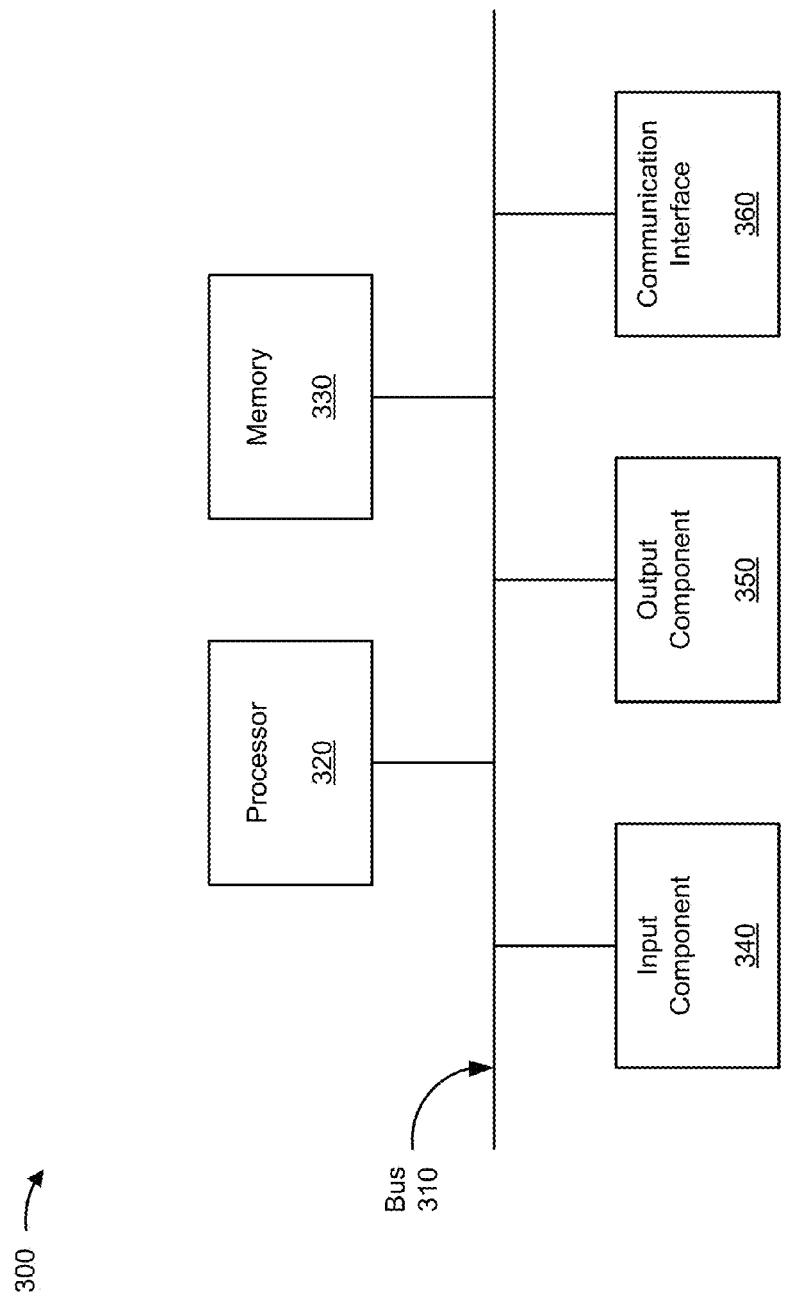
FIG. 3 is a diagram of example components of a device that corresponds to one or more devices of FIG. 2.

FIG. 3 is a diagram of example components of a device 300 that corresponds to one or more devices of FIG. 2. Device 300 may correspond user device 210, operator device 220, MRA server 240, MRA storage device 250, CDN server 260, and/or content storage device 270. Additionally, or alternatively, user device 210, operator device 220, MRA server 240, MRA storage device 250, CDN server 260, and/or content storage device 270 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Additionally, or alternatively, input component 340 may include a sensor for sensing information.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
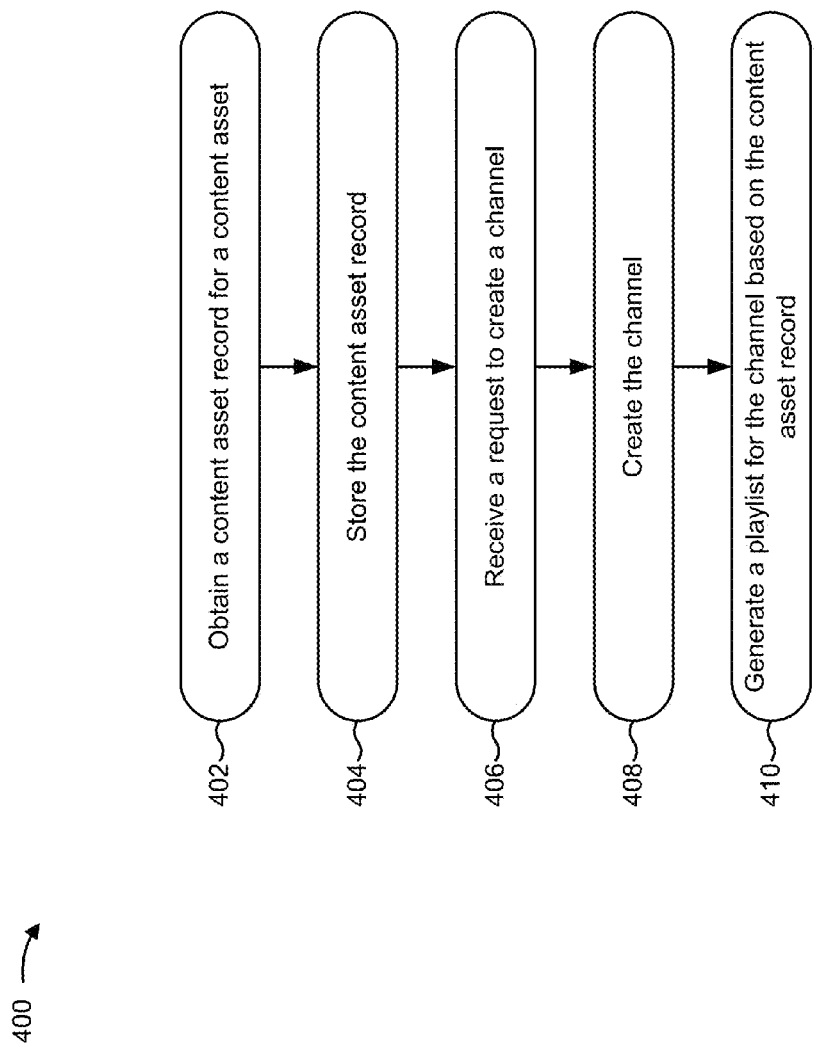
FIG. 4 is a flowchart of an example process for generating a playlist for a channel.

FIG. 4 is a flowchart of an example process 400 for generating a playlist for a channel. In some implementations, one or more process blocks of FIG. 4 may be performed by MRA server 240. Additionally, or alternatively, one or more process blocks of FIG. 4 may be performed by another device or a group of devices separate from or including MRA server 240.

As shown in FIG. 4, process 400 may include obtaining a content asset record for a content asset (block 402). For example, MRA server 240 may obtain or receive the content asset record.

The content asset may include any kind of live or recorded content (e.g., a TV show, a movie, a home video, a music video, a broadcast of a sporting event, a broadcast of a live event, or the like) that has been encoded and broken into segments (e.g., according to the HLS protocol). While the following description focuses on the HLS protocol, implementations described herein are not so limited and may apply to other protocols.

The content asset record may be information (e.g., metadata) about an associated content asset. The content asset record may include a content asset identifier (ID) that uniquely identifies the content asset. The content asset identifier may be a string of characters of any length. The content asset record may include a content asset name (e.g., a name of a TV show and/or an episode). The content asset record may identify a duration of the content asset (e.g., 30 minutes, 1 hour, etc.). The content asset record may include information identifying a start time and an end time. The start time may indicate a time and/or date after which the associated content asset may be played on a channel. The end time may indicate a time and/or date, following the start time, after which the associated content asset may not be played on a channel. The content asset record may identify a content asset type of the associated content asset. For example, the content asset type may include a live program and/or a recorded program.

In some implementations, the content asset record may include a manifest address identifying the location of a content asset manifest file. For example, the manifest address may include a URL that points to the content asset manifest file. In some implementations, the content asset manifest file may be a M3u8 file. The content asset manifest file may include multiple profiles for the content asset encoded at different data rates and/or resolutions. Each profile may include segment addresses for multiple segments of the content asset encoded at respective data rates and/or resolutions. The content asset manifest file will be described in greater detail with respect to FIG. 7.

In some implementations, MRA server 240 may obtain or receive the content asset record, or metadata necessary to create the content asset record. For example, an operator of a channel may operate operator device 220 to transmit a file comprising the content asset record itself to a specified location (e.g., a watch folder) monitored by MRA server 240. MRA server 240 may detect that the file is at the specified location and obtain the file. Additionally, or alternatively, operator device 220 may transmit a file (e.g., an extensible markup language (XML) file) including metadata for the content asset to a specified location (e.g., a watch folder) monitored by MRA server 240. MRA server 240 may detect that the file is at the specified location and obtain the file. MRA server 240 may then generate a content asset record based on the metadata included in the file.

In some implementations, MRA server 240 may allow the operator to manually create the content asset record. For example, an operator may operate an operator device 220 to send a request to manually create a content record to MRA server 240. MRA server 240 may receive the request from operator device 220. MRA server 240 may provide a user interface to operator device 220 that prompts the operator to input metadata (e.g., the content asset ID, the content asset name, the start time, the end time, the content type, and/or the manifest address). The operator may input the metadata into operator device 220 and operator device 220 may transmit the metadata to MRA server 240. MRA server 240 may receive the metadata and generate the content asset record based on the metadata.

As further shown in FIG. 4, process 400 may include storing the content asset record (block 404). For example, MRA server may store the content asset record (e.g., information about an associated content asset) in a memory included in MRA storage device 250 and/or a memory included in MRA server 240. In some implementations, MRA server 240 may store the content asset record as an entry in a content asset data structure stored by a memory included in MRA storage device 220 and/or MRA server 240. The content asset data structure may include entries for multiple content asset records.

As further shown in FIG. 4, process 400 may include receiving a request to create a channel (block 406). For example, MRA server 240 may receive the request to create the channel from operator device 220 operated by an operator.

A channel may be a streaming video channel over which media content is distributed (e.g., a Virtual Linear Channel (VLC)). The request to create the channel may include channel information identifying a channel name, a channel ID, a channel category (e.g., a recorded channel, a live channel, a recorded and live channel, etc.), and/or a publishing address. In some implementations, the publishing address (e.g., a URL) may identify the location of a publishing point on CDN server 260 where a channel manifest file for the channel is published. Additionally, or alternatively, MRA server 240 may receive the request and provide operator device 220 a user interface to input the channel information. The operator may input the channel information into operator device 220 via the user interface, and operator device 220 may send the channel information to MRA server 240.

As further shown in FIG. 4, process 400 may include creating the channel (block 408). For example, MRA server 240 may, based on receiving the request, create the channel by creating an entry in a channel data structure. The channel data structure may be stored in a memory included in MRA server 240 and/or in a memory accessible by MRA server 240 (e.g., a memory included in MRA storage device 250). MRA server 240 may store the channel information in the created entry.

As further shown in FIG. 4, process 400 may include generating a playlist for the channel based on the content asset records (block 410). For example, MRA server 240 may use information from the content asset records, stored in the content asset data structure, to generate the playlist for the channel.

The operator may use operator device 220 to send a request to create a playlist to MRA server 240. MRA server 240 may receive the request from operator device 220. MRA server 240 may provide operator device 220 with a user interface prompting the operator to select content assets, identified by the content asset data structure, to be played on the channel and to be identified by the playlist. The playlist may not include the content assets themselves (e.g., video files, audio files, etc.). Rather, the playlist may include information identifying content assets. Operator device 220 may receive the user interface and display the user interface to the operator.

The operator may use the user interface to make selections for the playlist. For example, the operator may select a channel for the playlist. Additionally, or alternatively, the operator may select a content asset to be played on the channel and to be identified by the playlist. For instance, the operator may search the content asset data structure using a content asset name, a content asset ID, or the like to identify a content asset to be selected. The operator may select a start time and end time for the content asset to be played on the channel. Additionally, or alternatively, the operator may select multiple content assets to be identified by the playlist and select an order the content assets are to be played on the channel.

Operator device 220 may receive the selections made by the operator via the user interface and send the selections to MRA server 240. MRA server 240 may receive the selections and generate the playlist based on the selections. The playlist may be a data structure that identifies content assets to be played on the channel. While the playlist may include information identifying the content assets, the playlist may not include the content assets themselves (e.g., media files for playing the content assets).

The playlist may include order information indicating the order in which content assets are to be played on the channel. The order information may be obtained from the selections made by the operator. The playlist may include a content asset ID and/or content asset name for each content asset identified by the playlist. In addition, the playlist may indicate a start time and/or an end time for each content asset. Further, the playlist may include a manifest address for a content asset manifest file associated with each content asset. MRA server 240 may obtain the manifest address associated with a content asset by querying the content asset data structure using the content asset ID and/or content asset name for the selected content asset. In some implementations, the playlist may include information that indicates whether each content asset is a live program or a recorded program. Additionally, or alternatively, the playlist may include a publishing address. The publishing address may correspond to a single URL via which user devices 210 access the channel. MRA server 240 may obtain the publishing address from the memory storing the channel information. The playlist will be described in more detail with respect to FIG. 5.

In some implementations, the playlist may be generated by a device other than MRA server 240 and the other device may send the playlist to MRA server 240. In these implementations, MRA server 240 may receive the playlist from the other device.

While a series of blocks has been described with regard to FIG. 4, the blocks and/or the order of the blocks may be modified in some implementations. Additionally, or alternatively, non-dependent blocks may be performed in parallel.

Figure 5:
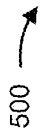
FIG. 5 is a diagram of an example implementation of a playlist for a channel.

FIG. 5 is a diagram of an example implementation of a playlist 500 for a channel, such as an example channel A. Playlist 500 may be a data structure that includes one or more entries associated with content assets. An entry may include an order field 510, a content asset ID field 520, a start time field 530, an end time field 540, a manifest address field 550, and/or a publishing address field 560. An entry may include fewer fields than shown in playlist 500, additional fields than shown in playlist 500, and/or different fields than shown in playlist 500.

Order field 510 may include order information indicating the order a content asset is to be played on the channel. For example, as shown in FIG. 5, order field 510 may include a value (e.g., 1, 2, 3, etc.) indicating the order the content asset is to be played relative to other content assets.

Content asset ID field 520 may include information that uniquely identifies a content. For example, as shown in FIG. 5, content asset ID field 520 may include a content asset ID "XYZ" that identifies a particular content asset to be played on the channel.

Start time field 530 may indicate a time and/or date that the content asset should start being played on the channel. For example, as shown in FIG. 5, start time field 530 may indicate a start time of 11:00:00 AM for the content asset having asset ID "XYZ."

End time field 540 may indicate a time and/or date that the content asset should stop being played on the channel. For example, as shown in FIG. 5, end time field 540 may indicate an end time of 11:30:00 AM for the content asset having asset ID "XYZ."

Manifest address field 550 may indicate an address at which a content asset manifest file for the content asset may be obtained. For example, as shown in FIG. 5, manifest address field 550 may include a URL for a particular content asset manifest file (e.g., http://index1.url) associated with the asset having asset ID "XYZ.".

Publishing address field 560 may indicate an address at which a channel manifest file for the content asset is to be published (e.g., a publishing address). For example, as shown in FIG. 5, publishing address field 560 may include a URL indicating a particular publishing address (e.g., http://location.url) for the content asset having asset ID "XYZ.".

Assume a content asset, having a content asset ID "XYZ," is the first content asset to be played on channel A. Additionally, assume the content asset is to be played from 11:00:00 AM to 11:30:00 AM. Further, assume the content asset manifest file for the content asset is located at http://index1.url and the publishing address is http://location.url. Accordingly, as shown in FIG. 5, an entry in playlist 500 for such a content asset may include a value of "1" in order field 510, a content asset ID of "XYZ" in content asset ID field 520, a value for 11:00:00 AM in start time field 530, a value for 11:30:00 AM in end time field 540, information identifying the URL of http://index1.url in manifest address field 550, and/or information identifying the URL of http://location.url in publishing address field 560.

Playlist 500 is merely an example of a playlist and a playlist may take different forms than playlist 500.

Figure 6A:
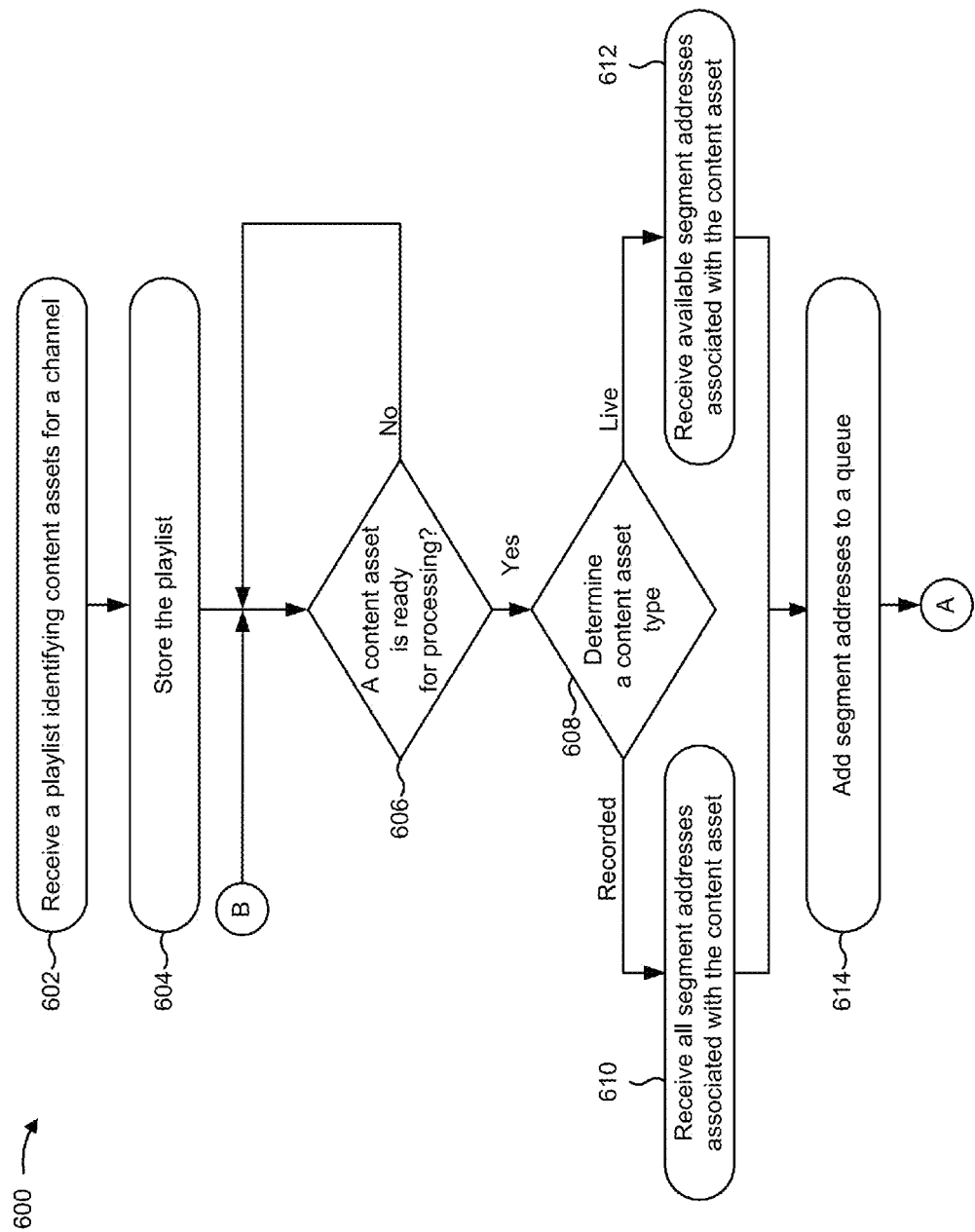
FIGS. 6A and 6B are flowcharts of an example process for publishing a channel manifest file based on a playlist.
Figure 6B:

FIGS. 6A and 6B are flowcharts of an example process 600 for publishing a channel manifest file based on a playlist. In some implementations, one or more process blocks of FIGS. 6A and 6B may be performed by MRA server 240. Additionally, or alternatively, one or more process blocks of FIGS. 6A and 6B may be performed by another device or a group of devices separate from or including MRA server 240.

As shown in FIG. 6A, process 600 may include receiving a playlist identifying content assets for a channel (block 602). For example, MRA server 240 may generate the playlist as described above in connection with block 410 of FIG. 4. Additionally, or alternatively, MRA server 240 may receive the playlist from another device (e.g., operator device 220) that generated the playlist. While the playlist may include information identifying the content assets, the playlist may not include the content assets themselves (e.g., media files for playing the content assets).

MRA server 240 may constantly be monitoring if an updated playlist is received for the channel throughout process 600.

As further shown in FIG. 6A, process 600 may include storing the playlist (block 604). For example, MRA server 240 may store the playlist in a MRA data structure stored in a memory of MRA storage device 250.

The playlist may be updated at any time by MRA server 240 and/or operator device 220. For example, an updated playlist may be received for the channel before all the content assets identified by the playlist have been processed. In some implementations, the start times and/or end times of content assets may be updated, the order of content assets may be updated, new content assets may be added to the playlist, content assets may be removed from the playlist, etc. For instance, if a live program ran longer than originally scheduled (e.g., a football game went into overtime), then the playlist may be updated to update the end time of the football game and the start time of the next content asset to be played on the channel. Additionally, or alternatively, if a content asset cannot be played on the channel due to legal or other reasons (e.g., a football game is "blacked out" or canceled due to weather), the content asset can be replaced with another content asset in real time. In some implementations, content assets (e.g., advertisements) may be added to the playlist to be played while another content asset is played on the channel and/or between other content assets being played on the channel. In other words, the playlist is dynamic which gives an operator of the channel flexibility in scheduling content assets for the channel.

In some implementations, MRA server 240 may associate status information with each content asset identified by the playlist. The status information may indicate whether a content asset is ready for processing, not ready for processing, and/or already processed. For example, a content asset may be ready for processing when a present time is the same as or later than a start time associated with the content asset. On the other hand, a content asset may not be ready for processing when the present time is before the start time associated with the content asset. When the present time is the same as or later than a start time associated with the content asset, MRA server 240 and/or MRA storage device 250 may update the status information for the content asset to indicate that the content asset is ready for processing.

As further shown in FIG. 6A, process 600 may include determining whether a content asset is ready for processing (block 606). For example, MRA server 240 may determine whether a content asset is ready for processing.

In some implementations, MRA server 240 may determine that a content asset is ready for processing when the start time, associated with the content asset, matches the present time (e.g., a time the determination is made).

In some implementations, MRA server 240 may check the status information associated with a content asset identified by the playlist to determine if the content asset is ready for processing. If the status information indicates the content asset is ready for processing, MRA server 240 may determine that the content asset is ready for processing. If the status information indicates the content asset is not ready for processing and/or has already been processed, MRA server 240 may determine that the content asset is not ready for processing.

In some implementations, MRA server 240 may determine that a content asset is ready for processing based on the order information included in the playlist that indicates the order in which content assets are to be played on the channel. MRA server 240 may determine that a first content asset in the order that has not already been processed (e.g., a next content asset) is ready to be processed. Additionally, or alternatively, MRA server 240 may determine that a next particular quantity of assets are ready for processing. For example, MRA server 240 may determine that the first two content assents in the order that have not already been processed are ready to be processed.

In some implementations, MRA server 240 may determine that a content asset is ready for processing based on the start time and the end time of the content asset. For example, MRA server 240 may determine that content assets having a start time within a particular time frame are ready for processing (e.g., the next 2 hours, 3 hours, etc.).

If MRA server 240 determines that a content asset identified by the playlist is ready for processing (block 606—yes), then process 600 may advance to block 608. If MRA server 240 determines a content asset identified by the playlist is not ready for processing (block 606—no), then MRA server 240 may wait until a content asset is ready for processing and process 600 may return to block 606.

As further shown in FIG. 6A, if a content asset is determined to be ready for processing (block 606—yes), process 600 may include determining a content asset type of the content asset (block 608). For example, MRA server 240 may determine whether the content asset type, of the content asset ready to be processed, is a live program or a recorded program.

MRA server 240 may determine the content asset type based on the playlist. For example, the playlist may include information indicating whether the content asset is a live program or a recorded program. Additionally, or alternatively, MRA server 240 may access the content asset manifest file via the manifest address included in the playlist. The content asset manifest file may indicate whether the content asset is a live program or a recorded program, and MRA server 240 may determine the content asset type of the content asset based on the information in the content asset manifest file.

As further shown in FIG. 6A, if the content asset is determined to be a recorded program (block 608—recorded), process 600 may include receiving all segment addresses associated with the content asset (block 610). For example, MRA server 240 may receive all the segment addresses.

MRA server 240 may access the content asset manifest file for the content asset via the manifest address included in the playlist. The content asset manifest file may include profile addresses (e.g., URLs and/or pointers to memory locations) for multiple sub-manifest files associated with different profiles. Each sub-manifest file may be associated with the same content encoded at different resolutions (e.g., 1080 progressive scan (p), 720p, etc.) and/or encoded for different bandwidths. MRA server 240 may access each sub-manifest file via the profile addresses. Each sub-manifest file may include multiple segment addresses (e.g., URLs and/or pointers to memory locations) that each point to a segment file of the content encoded at a resolution and/or bandwidth for a respective profile. The segment files may be stored in a memory, such as a memory of content storage device 270. In other words, a segment address points to a media file that makes up a segment of the content asset. MRA server 240 may receive the segment addresses by downloading the segment addresses from the sub-manifest files for each profile. However, MRA server 240 may not download the segment itself (e.g., the media file).

A recorded content asset may be associated with a recorded program (e.g., a prerecorded content). The full length of the recorded program (e.g., all the segment files for the content asset) may have already been encoded at various resolutions and/or for various bandwidths. Accordingly, the segment addresses for all segment files of the content asset may be included in the sub-manifest files. Thus, MRA server 240 may download all the segment addresses from the sub-manifest files at the same time for the content asset that is ready to be processed. The process of receiving the segment addresses will be discussed in more detail with respect to FIG. 7.

As further shown in FIG. 6A, if the content asset is determined to be a live program (block 608—live), process 600 may include receiving available segment addresses associated with the content asset (block 612). For example, MRA server 240 may receive the available segment addresses in the same manner described at block 610.

A live content asset may be associated with a live program. Unlike a recorded content asset, the full length of the live program may not have been encoded. Instead, segment files for the live program may be encoded in real time as a live program is recorded. Accordingly, the sub-manifest files may only include segment addresses for the segment files that have been encoded. MRA server 240 may receive the segment addresses that are available in the sub-manifest files. MRA server 240 may continually access the content asset manifest file and/or the sub-manifest files to receive new segment addresses until the live program is finished and all segment addresses have been received. The process of receiving the segment addresses will be described in more detail with respect to FIG. 7.

In some implementations, block 608, 610, and/or 612 may occur before block 606. In other words, MRA server 240 may receive segment addresses associated with a content asset before the content asset is ready for processing. MRA server 240 may store the segment addresses in the MRA data structure until the content asset is ready for processing. Additionally, or alternatively, MRA server 240 may store status information for each segment address indicating whether a segment address is not ready for processing, ready for processing, and/or already processed.

Figure 7:
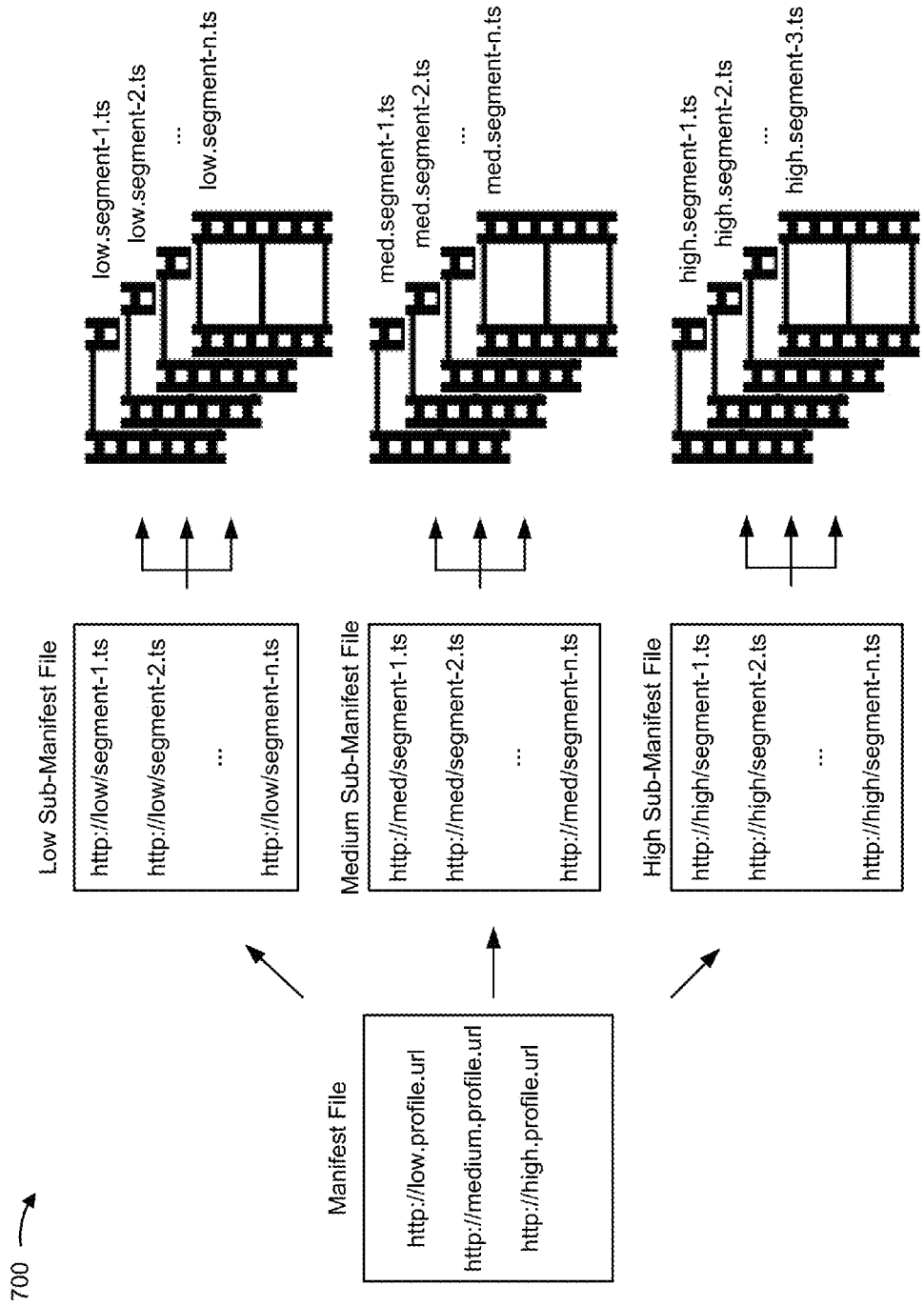
FIG. 7 is a diagram of an example implementation for receiving segment addresses for the channel manifest file relating to the process shown in FIGS. 6A and 6B.

FIG. 7 is a diagram of an example implementation 700 relating to receiving the segment addresses for the content asset as described at blocks 610 and 612 of FIG. 6A. In example implementation 700, assume a content asset is ready for processing and the playlist includes a manifest address for a content asset manifest file associated with the content asset.

MRA server 240 may access the content asset manifest file via the manifest address. The content asset manifest file may include a low profile address (e.g., http://low.profile.url) for a low sub-manifest file corresponding to a low profile, a medium profile address (e.g., http://med.profile.url) for medium sub-manifest file corresponding to a medium profile, and a high profile address (e.g., http://high.profile.url) for a high sub-manifest file corresponding to a high profile. Assume the low profile corresponds to the content asset encoded at a low resolution (e.g., 480p). Additionally, assume the medium profile corresponds to the content asset encoded at a medium resolution (e.g., 720p). Furthermore, assume the high profile corresponds to the content asset encoded a high resolution (e.g., 1080p). Moreover, assume the content asset has been encoded in n number of segments at each resolution. Although FIG. 7 illustrates three profile addresses, there may be fewer, more, or different profile addresses included in the content asset manifest file.

MRA server 240 may access the low sub-manifest file via the low profile address (e.g., http://low.profile.url). The low sub-manifest file may include segment addresses for each segment file of the content asset encoded at 480p resolution. A segment file may have a timed segment (.ts) extension. The low sub-manifest file may include a segment address http://low/segment-1.ts that points to a media file (e.g., low.segment-1.ts) for the first segment of the content asset encoded at 480p resolution. MRA server 240 may download the segment addresses for the first low segment through the nth low segment. However, MRA server 240 may not download the low segment files themselves (e.g., the media files).

MRA server 240 may access the medium sub-manifest file via the medium profile address (e.g., http://medium.profile.url). The medium sub-manifest file may include segment addresses for each segment of the content asset encoded at 720p resolution. For example, the medium sub-manifest file may include a segment address http://med/segment-1.ts that points to a media file (e.g., med.segment-1.ts) for the first segment of the content encoded at 720p resolution. MRA server 240 may download the segment addresses for the first medium segment through the nth medium segment. However, MRA server 240 may not download the medium segment files themselves (e.g., the media files).

MRA server 240 may access the high sub-manifest file via the high profile address (e.g., http://high.profile.url). The high sub-manifest file may include segment addresses for each segment of the content asset encoded at 1080p resolution. For example, the high sub-manifest file may include a segment address http://high/segment-1.ts that points to a media file (e.g., high.segment-1.ts) for the first segment of the content asset encoded at 1080p resolution. MRA server 240 may download the segment addresses for the first high segment through the nth high segment. However, MRA server 240 may not download the high segment files themselves (e.g., the media files).

Accordingly, MRA server 240 may download segment addresses for each of the profiles in the content asset manifest file. In other words, three segment addresses (e.g., low, medium, and high) may be downloaded for each segment of the content asset.

Returning to FIG. 6A, process 600 may include adding the segment addresses to a queue (block 614). For example, MRA server 240 may add the segment addresses in order to a queue included in a memory of MRA server 240. For instance, a first segment address for a first segment will be placed in the queue, followed by a second segment address for a second segment, and so forth.

In some implementations, MRA server 240 may add the segment addresses to more than one queue. For example, each profile may be associated with a different queue and segment addresses associated with respective profiles may be added to respective queues. Additionally, or alternatively, a single queue may be associated with multiple profiles. In such a case, all the segment addresses for the first segment will be placed in the queue, followed by all the segment address for the second segment, and so forth.

In some implementations, the segment addresses may be added to the end of the queue. Additionally, or alternatively, the segment addresses may be not be added to the end of the queue. For example, MRA server 240 may determine whether an update to the playlist requires modifying the queue. If the playlist is updated to include a new content asset that should be played immediately, the segment addresses for the new content asset may be added to the front of the queue and/or before the end of the queue.

In some implementations, process 600 may return to block 606 to determine if another content asset is ready for processing after the segment addresses for the content asset have been added to the queue and block 614 is complete. At the same time, process 600 may advance to block 616 once block 614 is complete. In other words, MRA server 240 may simultaneously advance to block 616 and add segment addresses for other content assets to the queue. For example, if a first content asset ready for processing is determined to be a recorded program, segment addresses for a second content asset may be added to the queue before a start time of the second content asset. However, if a first content asset ready for processing is determined to be a live program, MRA server 240 may have to wait for all the segment addresses for the live program to be received and added to the queue before segment addresses for the second content asset may be added to the queue, even if the second content asset is ready for processing.

In some implementations, segment addresses for an advertisement (e.g., a type of content asset) may be added to the queue in-between segment addresses for a program (e.g., another type of content asset). For example, the program may include breakpoints at which advertisements are to be played on the channel like a commercial break on a TV channel. MRA server 240 may obtain the segment addresses for the advertisement based on a manifest address for an advertisement manifest file like any other content asset. In some implementations, one or more of the segment addresses for the program may include a tag indicating the start of a breakpoint. MRA server 240 may add segment addresses for the advertisement to the queue based on the segment address for the program including the tag. For example, MRA server 240 may add segment addresses for the advertisement to the queue directly after the segment address for the program including the tag. The segment addresses for the advertisement may be followed by more segment address for the program in the queue. Additionally, or alternatively, MRA server 240 may add segment addresses for the advertisement to the queue based on a certain time and/or event. For example, segment addresses for the advertisement may be added to the front of the queue, the back of the queue, and/or the middle of the queue at a certain time.

In this way, segment addresses for an advertisement may be added to the queue even though the playlist may not specifically identify the advertisement. On the other hand, the playlist may identify an advertisement to be played on the channel and MRA server 240 may process the advertisement like any other content asset.

A shown in FIG. 6B, process 600 may include generating a batch of segment addresses from the queue (block 616). For example, MRA server 240 may generate a batch of segment addresses by stitching together segment addresses from the queue.

MRA server 240 may obtain a quantity of segment addresses from the queue and stitch the segment addresses together to create a batch. The term "stitch," "stitched," "stitching," or the like as used herein means associating and/or grouping items (e.g., segment addresses) together in order. For example, MRA server 240 may obtain the first three segment addresses in the queue and stitch the segment addresses together in the order the segment address are in the queue. Accordingly, a batch may include three segment addresses. However, the quantity of segment address in a batch is not limited to three, and there may be more than or fewer than three segment address in a batch (e.g., two segment addresses, fourth segment addresses, six segment addresses, etc.). In some implementations, the operator of operator device 220 may specify the quantity of segment addresses in a batch.

In some implementations, MRA server 240 may obtain a quantity of segment addresses for each profile. MRA server 240 may stitch together the quantity of segment addresses for each profile. For example, with regard to example implementation 700 shown in FIG. 7, segment addresses http://low/segment-1.ts, http://low/segment-2.ts, and http://low/segment-3.ts may be stitched together corresponding to segments 1 to 3 encoded at 480p to form a first batch. Likewise, segment addresses http://med/segment-1.ts, http://med/segment-2.ts, and http://med/segment-3.ts may be stitched together corresponding to segments 1 to 3 encoded at 720p to form a second batch. Similarly, segment addresses http://high/segment-1.ts, http://high/segment-2.ts, and http://high/segment-3.ts may be stitched together corresponding to segments 1 to 3 encoded at 1080p to form a third batch.

As further shown in FIG. 6B, process 600 may include publishing a channel manifest file including the batch of segment addresses (block 618). For example, MRA server 240 may generate a channel manifest file (e.g., a M3u8 file) including the batch of segment addresses. The channel manifest file may include multiple batches, associated with the same segments, and associated with different profiles. For example, the channel manifest file may include a first batch including segment addresses pointing to segments encoded at a first resolution. The channel manifest may include a second batch including segment addresses pointing to the same segments encoded at a second resolution.

MRA server 240 may obtain a publishing address associated with the content asset from the playlist stored in MRA storage device 250. MRA server 240 may publish the channel manifest file by sending the channel manifest file to a publishing point on CDN server 260 identified by the publishing address. CDN server 260 may receive the channel manifest file and update and/or replace a stored channel manifest file for the channel. The channel manifest file may be accessible to a user via a channel address (e.g., a URL). The channel address may be the same as or different than the publication address.

A user device 210, having a HLS player, may access the channel via the channel address. CDN server 260 may send user device 210 the channel manifest file. User device 210 may determine which batch of segment addresses should be used based on a connection with network 280 (e.g., a bandwidth of the connection) and/or subscription level of a subscription associated with user device 210. For example, user device 210 may determine the first batch of segment addresses should be accessed based on a high available bandwidth, and may determine the second batch of segment addresses for the same segments should be accessed based on a low available bandwidth. User device 210 may access the segment files via the segment addresses in the determined batch. User device 210 may receive the segment files and play the segment files using the HLS player. User device 210 may repeat the process (e.g., obtaining updated channel manifest files from CDN server 260 and obtaining segment files from content storage device 270 identified by new batches of segment addresses) according to HLS protocol. For example, user device 210 may obtain segment files encoded at a first resolution for a first batch based on the bandwidth of the connection. Later, the bandwidth of the connection may improve, and user device 210 may receive segment files encoded at a second resolution, higher than the first resolution, for a second batch based on the improved bandwidth. In some implementations, when the channel includes advertisements to be played, user devices 210 in different locations may receive different advertisements. For example, user device 210 may obtain segment files for playing an advertisement from content storage device 270 based on a location of user device 210 and the segment addresses for the advertisement included in the channel manifest file.

As further shown in FIG. 6B, process 600 may include updating the MRA data structure based on the published channel manifest file (block 620). For example, MRA server 240 may update the status information associated with the content asset identified by the playlist. In some implementations, the status information for the content asset that indicated the content asset was ready for processing may be updated to indicate the content asset is already processed if all the segment addresses for the content asset have been published.

Additionally, or alternatively, the MRA data structure may indicate status information for a content asset and/or for each segment address associated with the content asset. Accordingly, the status information for each published segment address may be updated to indicate the segment addresses are already processed.

As further shown in FIG. 6B, process 600 may include determining whether the queue is empty (block 622). For example, MRA server 240 may determine that the queue is empty when the queue does not include any segment addresses.

If MRA server 240 determines the queue is not empty and there are more segment addresses to be stitched (block 622—no), then process 600 may return to block 616 and a new batch of segment addresses may be generated from the queue. MRA server 240 may wait a certain amount of time before generating a new batch of segment addresses (e.g., 5 seconds, 10 seconds, etc.). The amount of time, for example, may be based on a time length of the segments associated with the segment addresses included in the batch.

On the other hand, if MRA server 240 determines the queue is empty and there are no more segment addresses to be stitched (block 622—yes), then process 600 may advance to block 624.

As further shown in FIG. 6B, if the queue is determined to be empty (block 622—yes), process 600 may include determining whether all content assets identified by the playlist have been processed (block 624). MRA server 240 may determine whether all content assets identified by the playlist have been processed by checking the status information associated with the content assets identified by the playlist.

If the status information of any content asset identified by the playlist indicates that the content asset has not been processed (e.g., whether it is ready to process and/or not ready to process), MRA server 240 may determine all content assets identified by the playlist have not been processed. If MRA server 240 determines all content assets identified by the playlist have not been processed (block 624—no), then process 600 may return to block 606 in FIG. 6A to determine if a content asset is ready for processing. In some implementations, MRA server 240 may perform block 624 simultaneously and/or before determining if the queue is empty in block 622. In other words, MRA server 240 may return to block 606 and add new segment addresses, associated with new content assets, to the queue before the queue is empty If the status information for each of the content assets identified by the playlist indicates all the content assets are already processed, MRA server 240 may determine all content assets identified by the playlist have been processed. If MRA server 240 determines all content assets identified by the playlist have been processed (block 624—yes), then process 600 may end (block 626). For example, MRA server 240 may return to block 602 in FIG. 6A and wait for a new playlist to be received. In some implementations, MRA server 240 may delete the playlist from the MRA data structure. Alternatively, MRA server 240 may continue to store the playlist in the MRA data structure.

While a series of blocks has been described with regard to FIGS. 6A and 6B, the blocks and/or the order of the blocks may be modified in some implementations. Additionally, or alternatively, non-dependent blocks may be performed in parallel.

Figure 8A:
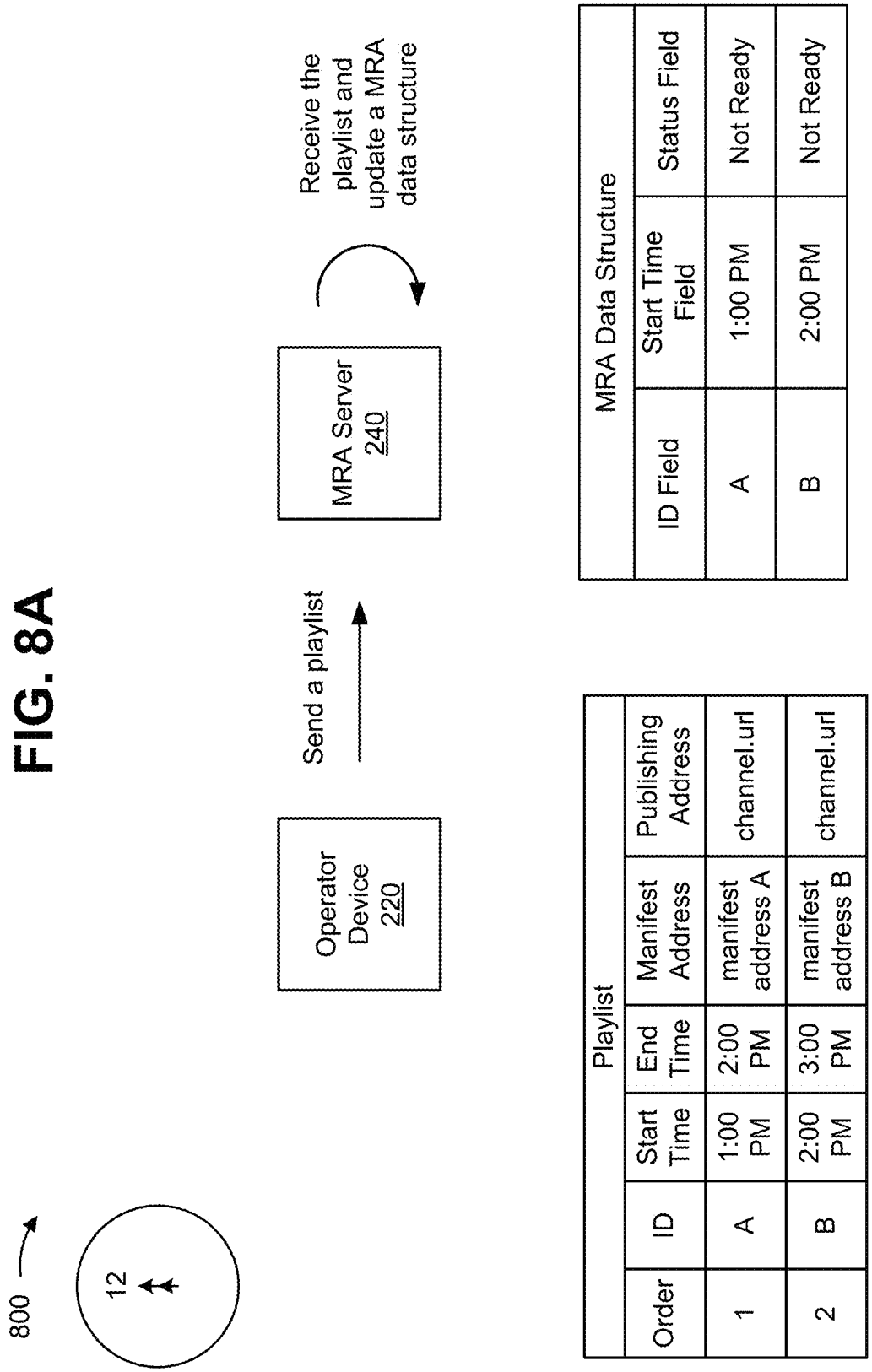
Figure 8B:
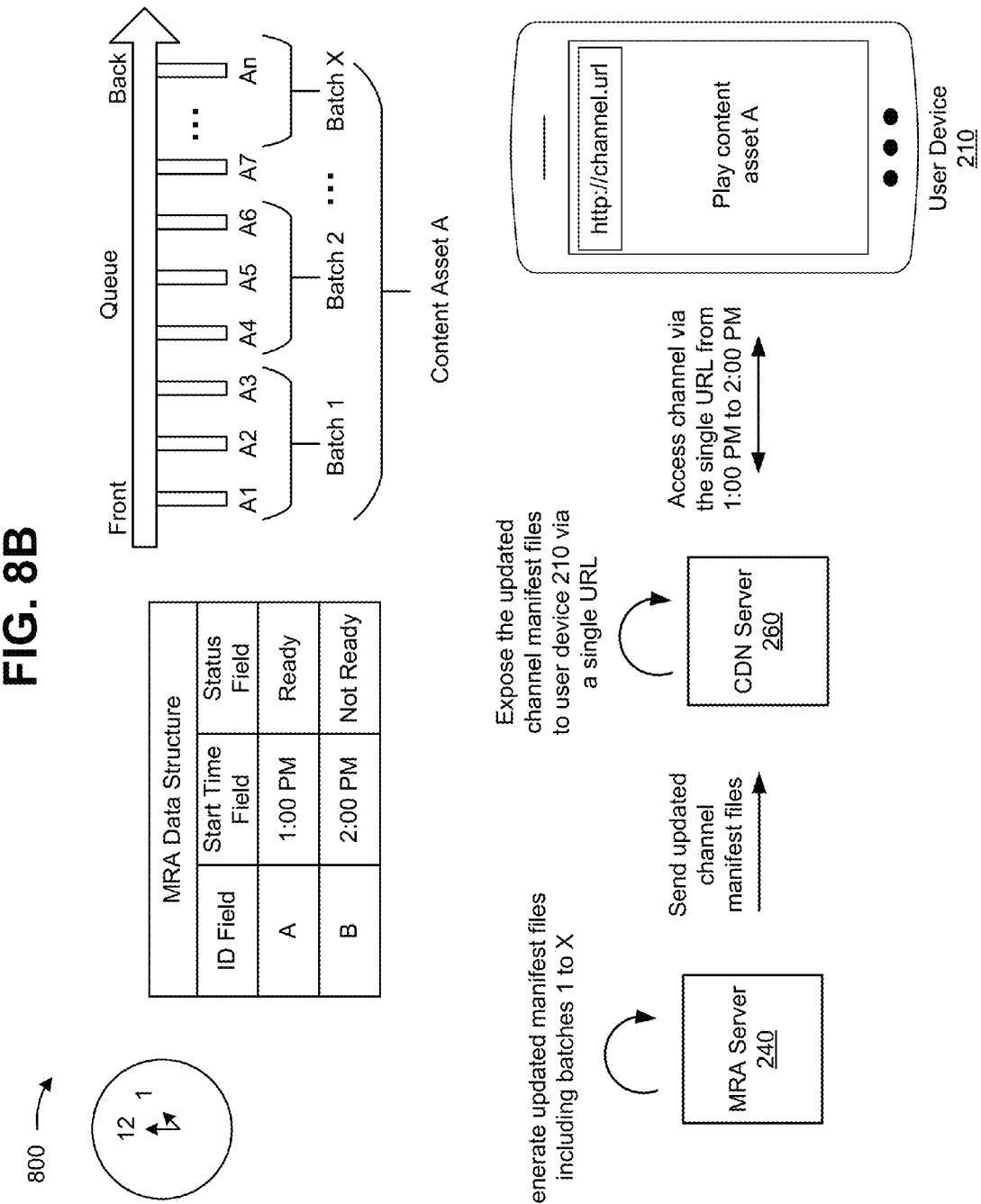

FIGS. 8A to 8C are diagrams of an example implementation 800 relating to process 600 shown in FIGS. 6A and 6B.

As shown in FIG. 8A, operator device 220 may send a playlist for a channel to MRA server 240 and MRA server 240 may receive the playlist. Assume the playlist indicates a content asset A (e.g., a recorded program) should be played from 1:00 PM to 2:00 PM and indicates a content asset B (e.g., a live program) should be played from 2:00 PM to 3:00 PM. Also, assume the playlist includes a manifest address A indicating a location of a content asset manifest file A for content asset A and includes a manifest address B indicating a location of a content asset manifest file B for content asset B. Furthermore, assume the playlist includes a publishing address (e.g., channel.url) indicating a publishing point on CDN server 260 for the channel. Additionally, assume MRA server 240 receives the playlist at noon and stores the playlist in an MRA data structure included in MRA storage device 250. MRA server 240 may associate status information with content asset A and content asset B indicating that the content assets are not ready for processing (e.g., the start times do not match the present time of noon). MRA server 240 may store the status information in a MRA data structure included in a memory of MRA storage device 250.

As shown in FIG. 8B, assume the present time is now 1:00 PM. Accordingly, MRA server 240 may update the status information in the MRA data structure associated with content asset A to indicate content asset A is ready for processing. MRA server 240 may obtain manifest address A from the playlist and access content asset manifest file A using manifest address A. Content asset manifest file A may include all segment addresses for content asset A because content asset A is a recorded program. Assume that there are n number of segment addresses for content asset A and segment addresses A1 to An represent segment addresses for one of multiple profiles. MRA server 240 may download segment addresses A1 to An from the content asset manifest file and add segment addresses A1 to An to a queue. Additionally, or alternatively, MRA server 240 may download segment addresses for the other profiles from the content asset manifest file and add those segment addresses to the queue. MRA server 240 may stitch together three segment addresses to generate a batch. For example, MRA server 240 may stitch segment addresses A1, A2, and A3 together to generate batch 1.

As further shown in FIG. 8B, MRA server 240 may generate a channel manifest file including batch 1 and send the channel manifest file to CDN server 260 using the publishing address (e.g., channel.url) included in the playlist. MRA server 240 may remove segment addresses A1 to A3 (e.g., batch 1) from the queue and MRA server 240 may wait a certain amount of time before generating another batch. After the certain amount of time, MRA server 240 may stitch segment addresses A4, A5, and A6 together to generate batch 2. MRA server 240 may send an updated channel manifest file including batch 2 to CDN server 260 using the publishing address (e.g., channel.url) included in the playlist. MRA server 240 may repeat this process of generating batches and publishing an updated channel manifest file until the last batch (batch X) for content asset A is generated and published. In some implementations, MRA server 240 may simultaneously generate and publish batches for other profiles for content asset A while publishing batches 1 to X. For example, each updated manifest file may include multiple batches associated with the same segments, but associated with different profiles. After batch X is published, MRA server 240 may update the MRA data structure to indicate that content asset A is processed.

As further shown in FIG. 8B, a user of user device 210, having a HLS player or a similar player, may access the channel via a single URL (e.g., channel.url) at 1:00 PM. CDN server 260 may send user device 210 the channel manifest file including batch 1 (e.g., segment addresses A1 to A3) and user device 210 may receive the channel manifest file. User device 210 may access three segment files (e.g., video files) stored on content storage device 270 via segment addresses A1 to A3 in batch 1. User device 210 may receive the segment files and play the segment files using the HLS player (or a similar player). While MRA server 240 is publishing updated manifest files, user device 210 may repeat this process of obtaining updated channel manifest files from CDN server 260, obtaining segment files from content storage device 270 identified by new batches of segment addresses, and playing the segment files. For example, user device 210 may obtain an updated channel manifest file including batch 2 (but that does not include batch 1), another updated channel manifest file including batch 3 (but that does not include batches 1 and 2), and so on until an updated channel manifest file including batch X is received just before 2:00 PM. Accordingly, user device 210 may play asset A from 1:00 PM to 2:00 PM via the updated channel manifest files received though the single URL.

As shown in FIG. 8C, assume the present time is now 2:00 PM. Accordingly, MRA server 240 may update the status information in the MRA data structure associated with content asset B to indicate content asset B is ready for processing. MRA server 240 may obtain manifest address B from the playlist and access content asset manifest file B using manifest address B. Content asset manifest file B may only include some segment addresses for content asset B because content asset B is a live program and all the segments have not been encoded yet. Assume that there are five segment addresses (e.g., B1 to B5) available when MRA server 240 accesses content asset manifest file B and that segment addresses B1 to B5 are associated with one of multiple profiles for the associated segments. Accordingly, MRA server 240 may download segment addresses B1-B5 and add segment addresses B1-B5 to the queue.

As further shown in FIG. 8C, MRA server 240 may stitch together three segment addresses to generate a batch. For example, MRA server 240 may stitch segment addresses B1, B2, and B3 together to generate batch X+1 and remove segment address B1, B2, and B3 from the queue. MRA server 240 may update the channel manifest file to include batch X+1 and send the updated channel manifest file to CDN server 260 using the publishing address included in the playlist. Thus, batch X+1 for content asset B may be published directly after batch X for content asset A.

MRA server 240 may access content asset manifest file B again using the manifest address B. At this point in time, content asset manifest file B may include more segment addresses (e.g., B6 to B10) because more of the live program has been encoded. Accordingly, MRA server 240 may download segment addresses B6 to B10 and add the segment addresses to the queue. After the certain amount of time, MRA server 240 may stitch segment addresses B4, B5, and B6 together to generate batch X+2. MRA server 240 may update the channel manifest file to include batch X+2 and send the channel manifest file to the publishing point using the publishing address included in the playlist. MRA server 240 may repeat this process of accessing content asset manifest file B, downloading new segment address, generating batches, and publishing an updated channel manifest file until the last batch (batch X+Y) for content asset B is generated and published. In some implementations, MRA server 240 may simultaneously generate and publish batches for other profiles for content asset B while publishing batches X+1 to X+Y. For example, each updated manifest file may include multiple batches associated with the same segments, but associated with different profiles. After batch X+Y is published, MRA server 240 may update the MRA data structure to indicate that content asset B is processed.

As further shown in FIG. 8C, a user of user device 210, having a HLS player or a similar player, may be continuing to access the channel via the single URL (e.g., channel.url) at 2:00 PM. CDN server 260 may send user device 210 the updated channel manifest file including batch X+1 (e.g., segment addresses B1 to B3) and user device 210 may receive the updated channel manifest file. User device 210 may access three segment files (e.g., video files) stored on content storage device 270 via segment addresses B1 to B3 in batch X+1. User device 210 may receive the segment files and play the segment files using the HLS player (or a similar player). While MRA server 240 is publishing updated manifest files, user device 210 may repeat this process of obtaining updated channel manifest file from CDN server 260, obtaining segment files from content storage device 270 identified by new batches of segment addresses, and playing the segment files. For example, user device 210 may obtain an updated channel manifest file including batch X+2 (but not including batch X+1), another updated channel manifest file including batch X+3 (but not including batch X+2 and X+1), and so on until an updated channel manifest file including batch X+Y is received just before 3:00 PM. Accordingly, user device 210 may play asset B from 2:00 PM to 3:00 PM via the updated channel manifest files received though the single URL.

In this way, user device 210 may play multiple content assets via a channel accessed by a single URL.

Implementations described herein may provide a channel accessible via a single channel address, and may allow an operator of a channel to create a playlist identifying recorded programs and/or live programs to be played on the channel. Furthermore, implementations described herein may allow ad-hoc changes to the channel playlist in real time by allowing the operator to update the playlist as content assets are played on the channel. Moreover, implementations described herein may not require HLS player configuration to accommodate playing multiple content assets due to the one channel address being used to access the channel. Additionally, or alternatively, implementations described herein may not place limitations on the length of a content asset to be played on a channel and/or the number of content assets to be played on a channel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be an openended terms. Further, the phrase "based on" is intended to mean "based, at least in part, on" unless explicitly stated otherwise.

What is claimed is:

1. A device, comprising:
one or more processors to:
receive a playlist identifying a plurality of content assets to be played on a streaming video channel,
each content asset of the plurality of content assets including a respective plurality of segments;
associate status information with each content asset, of the plurality of content assets, based on the playlist, the status information indicating whether a content asset, of the plurality of content assets, is:
ready for processing,
not ready for processing, or
already processed;
obtain a plurality of segment addresses, associated with the plurality of content assets, based on determining that each content asset of the plurality of content assets is ready for processing;
add the plurality of segment addresses to a queue,
the plurality of segment addresses identifying memory locations at which the respective plurality of segments, included in each content asset of the plurality of content assets, are stored;
generate a batch of segment addresses from the plurality of segment addresses in the queue; and
publish a channel manifest for the streaming video channel based on the batch of segment addresses,
the plurality of content assets being accessible, via the channel manifest for the streaming video channel, through a single network address.

2. The device of claim 1, where the one or more processors are further to:
receive an updated playlist; and
store the updated playlist based on receiving the updated playlist.

3. The device of claim 1, where the one or more processors are further to:
check the status information, based on receiving the playlist, to determine whether one or more content assets, of the plurality of content assets, are ready for processing; and
determine that the one or more content assets are ready for processing based on the status information indicating the one or more content assets are ready for processing.

4. The device of claim 1, where the playlist includes order information,
the order information indicating an order in which the plurality of content assets are to be played on the streaming video channel; and
where the one or more processors are further to:
determine that a content asset, of the plurality of content assets, is ready for processing based on the order information.

5. The device of claim 1, where the one or more processors are further to:
determine a content asset type based on receiving the playlist,
the content asset type being one of a live program or a recorded program; and
where the one or more processors, when obtaining the plurality of segment addresses, are to:
obtain the plurality of segment addresses based on the content asset type.

6. The device of claim 1, where the plurality of segment addresses includes a first plurality of segment addresses for an advertisement and a second plurality of segment addresses for a program; and
where the one or more processors, when adding the plurality of segment addresses to the queue, are to:
add the first plurality of segment addresses for the advertisement to the queue in-between the second plurality of segment addresses for the program.

7. The device of claim 1, where the one or more processors are further to:
group the plurality of segment addresses together in order from the queue; and
where the one or more processors, when generating the batch of segment addresses, are to:
generate the batch of segment address based on grouping the plurality of segment addresses together in order from the queue.

8. A non-transitory computer-readable medium storing instructions, the instructions comprising:
a plurality of instructions that, when executed by one or more processors of a device, cause the one or more processors to:
receive a playlist identifying one or more content assets to be played on a streaming video channel,
each content asset of the one or more content assets including one or more respective segments;
associate status information with each content asset, of the one or more content assets, based on the playlist, the status information indicating whether a content asset, of the one or more content assets, is:
ready for processing,
not ready for processing, or
already processed;
obtain one or more segment addresses, associated with the one or more content assets, based on determining that each content asset of the one or more content assets is ready for processing;
add the one or more segment addresses to a queue,
the one or more segment addresses identifying one or more memory locations at which the one or more respective segments, included in each of the one or more content assets, are stored;
generate a batch of segment addresses from the one or more segment addresses in the queue; and
publish a channel manifest for the streaming video channel based on the batch of segment addresses,
the one or more content assets being accessible, via the channel manifest for the streaming video channel, through a single network address.

9. The non-transitory computer-readable medium of claim 8, where the plurality of instructions, that cause the one or more processors to publish the channel manifest, cause the one or more processors to:
generate a particular channel manifest file,
the particular channel manifest file including the batch of segment addresses.

10. The non-transitory computer-readable medium of claim 9, where the plurality of instructions, when executed by the one or more processors, further cause the one or more processors to:
provide the particular channel manifest file to a server to permit a stored channel manifest file for the streaming video channel to be replaced by the particular channel manifest file.

11. The non-transitory computer-readable medium of claim 8, where the plurality of instructions, when executed by the one or more processors, further cause the one or more processors to:
update the status information to indicate that the one or more content assets are already processed based on publishing the channel manifest.

12. The non-transitory computer-readable medium of claim 8, where the plurality of instructions, when executed by the one or more processors, further cause the one or more processors to:
receive an updated playlist, and
store the updated playlist based on receiving the updated playlist.

13. The non-transitory computer-readable medium of claim 8, where the plurality of instructions, when executed by the one or more processors, further cause the one or more processors to:
check the status information, based on receiving the playlist, to determine whether the one or more content assets are ready for processing; and
determine that the one or more content assets are ready for processing based on the status information indicating the one or more content assets are ready for processing.

14. The non-transitory computer-readable medium of claim 8, where the playlist includes order information,
the order information indicating an order in which the one or more content assets are to be played on the streaming video channel; and
where the plurality of instructions, when executed by the one or more processors, further cause the one or more processors to:
determine that a content asset, of the one or more content assets, is ready for processing based on the order information.

15. A method, comprising:
receiving, by a device, a playlist identifying a plurality of content assets to be played on a streaming video channel,
each content asset of the plurality of content assets including a respective plurality of segments;
associating, by the device, status information with each content asset, of the plurality of content assets, based on the playlist,
the status information indicating whether a content asset, of the plurality of content assets, is:
ready for processing,
not ready for processing, or
already processed;
obtaining, by the device, a plurality of segment addresses, associated with the plurality of content assets, based on determining that each content asset of the plurality of content assets is ready for processing;
adding, by the device, the plurality of segment addresses to a queue;
generating, by the device, a batch of segment addresses from the plurality of segment addresses in the queue;
publishing, by the device, a channel manifest for the streaming video channel based on the batch of segment addresses,
the plurality of content assets being accessible, via the channel manifest for the streaming video channel, through a single network address; and
updating, by the device, status information for one or more content assets, of the plurality of content assets, based on publishing the channel manifest.

16. The method of claim 15, further comprising:
determining a content asset type based on receiving the playlist,
the content asset type being one of a live program or a recorded program; and
where obtaining the plurality of segment addresses comprises:
obtaining the plurality of segment addresses based on the content asset type.

17. The method of claim 15, where the plurality of segment addresses includes a segment address for an advertisement and a particular plurality of segment addresses for a program; and
where adding the plurality of segment addresses to the queue comprises:
adding the segment address for the advertisement to the queue in-between the particular plurality of segment addresses for the program.

18. The method of claim 15, further comprising:
grouping the plurality of segment addresses together in order from the queue; and
where generating the batch of segment addresses comprises:
generating the batch of segment addresses based on grouping the plurality of segment addresses together in order from the queue.

19. The method of claim 15, where publishing the channel manifest comprises:
generating a particular channel manifest file,
the particular channel manifest file including the batch of segment addresses.

20. The method of claim 19, further comprising:
providing the particular channel manifest file to a server to permit a stored channel manifest file for the streaming video channel to be replaced by the particular channel manifest file.

* * * * *